Feb. 1, 1955

P. S. HARDY 2,700,912

LATHE

Filed April 27, 1950

Peter S. Hardy  Inventor

By Johnson and Kline
Attorneys

United States Patent Office 2,700,912
Patented Feb. 1, 1955

2,700,912

LATHE

Peter S. Hardy, Bridgeport, Conn.

Application April 27, 1950, Serial No. 158,380

13 Claims. (Cl. 82—28)

This invention relates to lathes and more particularly to indexing lathes for use in pattern making and similar work requiring angular layout operations.

The layout of a workpiece involving rotation of the piece about an axis, and the marking of points or lines at various angular positions about the axis can often be conveniently carried out on the same lathe where any cutting which is concentric on or coaxial with the above-mentioned axis is also performed. For this reason it has been known to provide the head spindle of the lathe with certain means for positioning the same at various degrees of rotation about its axis, such means normally taking the form of a plate or gear which is rigidly connected to the head spindle to rotate therewith and which is formed with a plurality of equiangularly spaced openings. Into these openings a locking element is projected to hold the head in any one of the angular positions represented by the holes. While this type of indexing means has value for ordinary work, when the accuracy characteristic in pattern work is to be attained, these lathes have serious drawbacks in that the inflexible number of circle divisions often does not permit the making of the exact setting required, or the setting when made can not be firmly held because of wear which has introduced play between the locking element and the sides of the appropriate hole. When such conditions are met an alternative method must be chosen which normally requires removing the work from the lathe and laying it out by fairly accurate but cumbersome geometric methods. This means that the work may have to be set up in the lathe and released therefrom a number of times during its fabrication with attendant possibilities for variations and inaccuracies in the replacement of the work in the lathe in addition to the severe loss in time of skilled craftsmen.

It is an object of this invention therefore, to provide a lathe in which the work can remain mounted both for cutting and indexing purposes, and in which the accuracy of setting necessary for pattern making layout can be achieved both as to any desired refinement of circle division as well as to firm retention of the setting once arrived at, even after the machine has experienced a long period of use and wear.

In order to attain this object, I have provided a lathe in which a rotary member is rigidly connected with the head spindle and work-holding means to rotate therewith and carries a position registering device. Another position registering device is mounted in close proximity to the first on a stationary portion of the lathe such as the headstock casting. One of these registering or index devices is a pointer or reference line while the other is a protractor scale accurately divided into angular increments of a circle. Friction clamping means are provided which are so designed that the head spindle and face plate can be held in any desired angular position according to any desired setting of the position indicating or index devices.

Another object of the invention is the provision of the foregoing advantages in a simplified and economical structure with a minimum of parts. In this connection there is provided a single rotatable element which can be rigidly secured to the head spindle for rotation therewith and which includes a handwheel, one of the position indicating means, and an element of the spindle clamping device.

It is another object of the invention, according to one form thereof, to provide a lathe headstock with an accurately divided scale member so mounted and protected that the same is sufficiently visible for convenient use, and at the same time is adequately protected against inadvertent mechanical damage due to blows and the like. This is accomplished by positioning the relatively rotatable pointer carrying part immediately adjacent to the scale and overlying and protecting the same except for a small portion of the scale arc near the pointer location.

Additional features and advantages will hereinafter appear.

Figure 1:
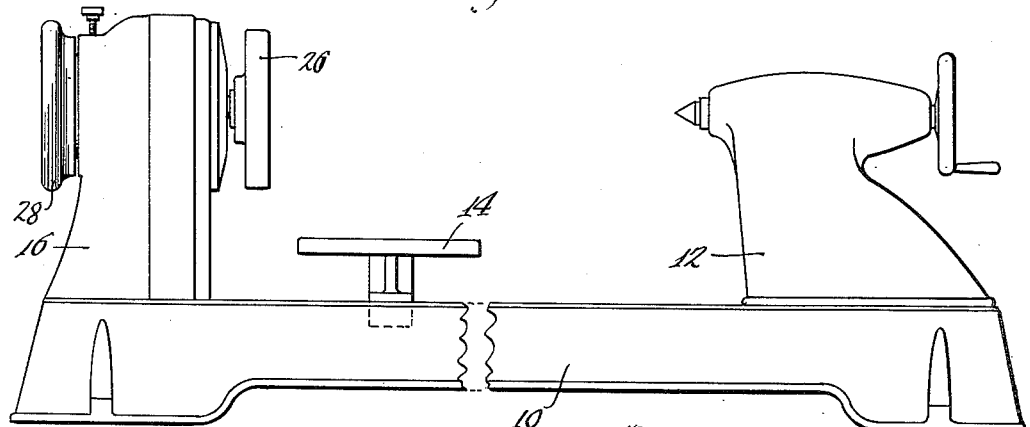
Figure 1 is a front elevation of a lathe according to the invention.
Figure 2:
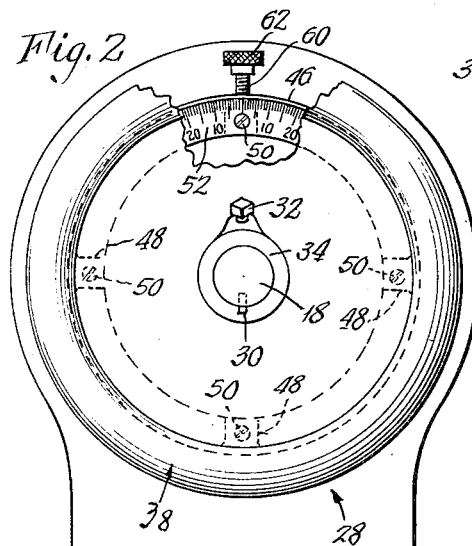
Fig. 2 is an enlarged end elevation of the headstock alone as seen looking from the left in Fig. 1, parts being broken away.
Figure 3:
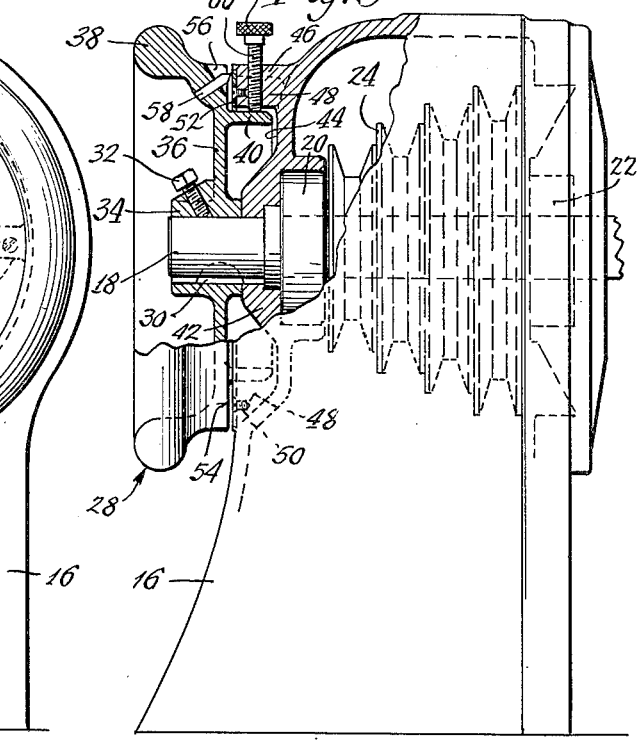
Fig. 3 is a front elevation, partially in section, of the headstock of Fig. 2.

The lathe of this invention, according to the form illustrated in Figs. 1 to 3, includes a conventional bed 10, tailstock 12 and tool rest 14. While the lathe herein is pictured as a wood turning lathe, it will be appreciated that this is purely for purposes of illustration and that the principles of the invention can be applied to the structure of a machine lathe with equal facility and value. A headstock bracket 16 in the form of a cast hollow housing is mounted on the bed 10 at the end thereof opposite the tailstock 12 and carries a head shaft or spindle 18 rotatably supported in bearings 20 and 22. Suitable driving means such as pulley cone 24 is mounted on and has a driving connection with the shaft 18, preferably within the housing 16. One end of the shaft 18 extends outside of the housing formed by the brackekt 16 towards the tailstock 12 and rigidly carries a work moutning means such as face plate 26, or any conventional form of work-holding chuck. The other end of the shaft projects beyond the outer end of the housing and carries a handwheel 28 which is drivingly connected thereto, for example by key 30 and set screw 32. The handwheel 28 comprises a hub 34 for mounting the wheel on shaft 18, web 36, hand ring 38 and an axially extending drum 40 whose purpose will be hereinafter explained. The headstock bracket 16 is formed with an outer end face which includes a central boss 42, an annular concavity 44 surrounding the boss, and a ring 46 which has a flat annular surface radially outwardly placed with respect to the concavity 44, defining the outer limits thereof, and lying in a plane perpendicular to the axis of shaft 18. Extending radially inwardly from ring 46 are a plurality of scale mounting bosses 48, and rigidly attached to bosses 48 by fasteners 50 is a full circle, accurately divided protractor scale 52 whose graduated periphery rests against the ring 46 on the headstock bracket for firm support.

As seen in Fig. 3 the parts are so proportioned that when the handwheel hub 34 abuts the outer end of the boss 42, the drum 40 will be positioned within the recess 44 with its inner end spaced slightly from the bottom thereof. Likewise the flat radial surface 54 surrounding the drum 40 on the inner surface of the handwheel 38 will be positioned in close proximity to and slightly spaced from the surface of the scale 52. The diametric dimension of the radial surface 54 is preferably such that it almost entirely overlies and protects the scale 52 from the injuries which it would receive due to inadvertent blows in normal shop use. However, at one point the periphery of the surface 54 is interrupted by a recess or notch 56 which exposes a small portion of the scale to view when the eye of the operator is in line with the notch. Centered in the notch 56 and firmly secured in the handwheel is a sharp steel pointer 58 which is positioned to lie with its tip just out of contact with the scale 52 whereby the angular setting of the handwheel and connected shaft 18 can be accurately determined.

The drum 40 constitutes one part of a clamping mechanism for holding the shaft 18 in any desired angular position. The other part of the clamping mechanism is shown in the drawing as being a brake element in the form of a radially extending screw 60 threadedly engaged in a tapped opening in one of the bosses 48 and provided with a knurled operating head 62 for manual operation. When it is desired to clamp the shaft 18 in any given position, the screw 60 is rotated so as to feed inwardly into contact with the drum 40 and firmly engage the same. When it is desired to have the shaft rotate freely, the screw 60 may be rotated by the head 62 to feed the same away from the drum 40 for release of the handwheel and shaft.

The placing of the drum on the handwheel is not only a convenient arrangement which provides for economy of construction, but also results in the significant feature of permitting the drum 40 to be of suitably large diameter without requiring that the headstock housing be enlarged or cut open. As shown, the drum 40 has a substantial radius and hence provides a sufficient moment arm to prevent inadvertent turning of the head spindle when held by the friction of clamping screw 60.

In order that the shaft 18 may be set at any desired angular position and accurately maintained therein, the outer surface of the drum 40 should remain smooth and free from irregularities which might cause slight angular displacement during the tightening of the screw 60. To this end the outer surface of the drum 40 is preferably ground as smooth as possible and hardened by any suitable process, while the screw 60 is made of metal slightly softer than the surface of the drum and still capable of carrying the required clamping loads on its threads. If necessary the tip of the screw 60 may be made softer than the threads, or a special shoe for bearing on the drum 40 may be attached to the tip of the screw 60 if desired. Likewise the movement of the brake member or screw 60 should be truly radial to prevent any tendency to move the drum during final tightening.

In the operation of the device of the invention, a workpiece which is to be laid out is placed against and firmly attached to the face plate 26 or swung between the headstock 16 and tailstock 12 depending upon its general configuration and the nature of its finished shape. If the first operation required is a turning down of the piece or a portion thereof, the screw 60 is released from the drum 40 and the lathe started and operated in the normal fashion to carry out this step. At such time as the condition of the workpiece calls for layout of various angular positions on its surface the lathe is stopped and the workpiece can be manipulated about the lathe axis by manual rotation of the handwheel 28. When a datum or zero position for the piece has been established it is identified by reading the position of the pointer 58 on the scale 52 and noted for future reference. Other angular positions of the workpiece can then be set by adding or subtracting their angular relationship from the protractor reading at the zero position. When the handwheel 28 has been turned so that the pointer 58 is opposite the desired position on the scale 52, the handwheel 28, the shaft 18, the face plate 26 and the attached workpiece can be firmly clamped in this position by tightening the screw 60, and the workpiece can be appropriately scribed while the parts are thus firmly held. When the screw 60 is again loosened the lathe and workpiece are in condition for further turning operations or for resetting at a different angular position. Additional turning and scribing steps can be performed as convenient by loosening the screw 60, or by tightening the same at an appropriate pointer setting whenever necessary.

Figure 4:
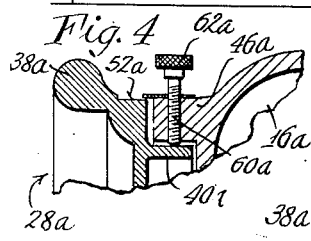
Fig. 4 is a fragmentary section similar to the upper portion of Fig. 3, but illustrating a modification of the invention.
Figure 5:
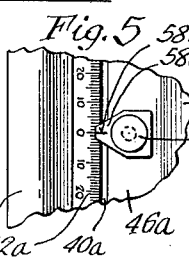
Fig. 5 is a fragmentary top plan of the device of Fig. 4.

Figs. 4 and 5 represent a slightly modified form of the invention in which all of the parts are generally similar to those shown in Figs. 1 to 3, being each designated by the same reference character as the corresponding part in Figs. 1 to 3, but with the postscript a attached. The main differences to be found are that instead of mounting the plane scale 52 on the parts 46, 48 of the headstock housing, the scale 52a is here shown as a cylindrical scale located around the periphery of the handwheel member 28a at a portion thereof which is in close proximity to the ring 46a on the headstock casting 16a. The scale 52a may be a separate band, first accurately graduated, and then attached to the surface of the handwheel member 28a, but preferably consists of markings stamped directly into the material of the handwheel member itself, as shown in Figs. 4 and 5. For cooperation with the scale 52a there is provided in this form of the invention a pointer 58a which may be a stiff sheet of metal scribed with an index line 58b and firmly attached to the ring 46a of the headstock casting 16a as by brazing or spot-welding thereto. The pointer 58a is arranged to overlie a portion of the scale 52a and present its index line 58b in close proximity to the graduations on said scale.

It will be understood that the operation of the device shown in Figs. 4 and 5 is in all respects similar to that described for the device of Figs. 1 to 3. The only respect in which any difference is seen to exist is with regard to the protection offered to the scale element, e. g. while the scale 52 is almost entirely protected from inadvertent blows or degrading contact, the scale 52a of Figs. 4 and 5 is only partially protected therefrom by being disposed in a recessed position and flanked on either side by the protruding portions of the hand ring 38a and the headstock housing 16a.

From the foregoing description, it can be seen that the invention provides a lathe in which both cutting operations and the marking of the angular positions about the axis can be accurately and alternately performed without necessity of removal of the work from the lathe. Furthermore a lathe structure is provided in which any desired degree of refinement in the angular adjustment of the head spindle can be achieved, the parts also being so designed and arranged that normal wear of the shaft clamping elements cannot introduce play or inaccuracy into the making of a setting.

Variations and modifications may be made within the scope of the claims and portions of the improvements may be used without others.

I claim:

1. A lathe comprising a headstock bracket member; a horizontal head shaft rotatably mounted on said bracket; driving means designed for power rotation of said shaft and rigidly mounted thereon; work-holding means on one end of said shaft at one side of said bracket; a handwheel member rigidly mounted on said shaft at the other side of said bracket and closely adjacent the surface thereof; and continuous indicating means including a protractor scale and cooperating pointer, one on each of said members for measuring their relative angular position about the axis of said shaft.

2. A lathe comprising a headstock bracket member; a horizontal head shaft rotatably mounted on said bracket; driving means designed for power rotation of said shaft and rigidly mounted thereon; work-holding means on one end of said shaft at one side of said bracket; a handwheel member rigidly mounted on said shaft at the other side of said bracket and closely adjacent the surface thereof; continuous indicating means including a protractor scale and cooperating pointer, one on each of said members for measuring their relative angular position about the axis of said shaft; and means for releasably clamping said shaft in a fixed position on said bracket in any desired angular relation thereto.

3. A lathe comprising a headstock bracket member; a horizontal head shaft rotatably mounted on said bracket; work-holding means on one end of said shaft at one side of said bracket; a handwheel member rigidly mounted on said shaft at the other side of said bracket and closely adjacent the surface thereof; and continuous indicating means including cooperating parts, one on each of said members for measuring their relative angular position about the axis of said shaft; and cooperating means on said members for releasably clamping and holding the same in any desired angular relation to each other.

4. A lathe comprising a headstock bracket member; a horizontal head shaft rotatably mounted on said bracket; work-holding means on one end of said shaft at one side of said bracket; a handwheel member rigidly mounted on said shaft at the other side of said bracket and closely adjacent the surface thereof; and continuous indicating means including cooperating parts, one on each of said members for measuring their relative angular position about the axis of said shaft; and cooperating means on said members for releasably clamping and holding the same in any desired angular relation to each other, said means comprising a drum on one of said members, and friction brake means on the other member for radial movement into and out of holding engagement with said drum.

5. A lathe comprising a headstock bracket member; a horizontal head shaft rotatably mounted on said bracket; work-holding means on one end of said shaft at one side of said bracket; a handwheel member rigidly mounted on said shaft at the other side of said bracket and closely adjacent the surface thereof; continuous indicating means including cooperating parts, one on each of said members for measuring their relative angular position about the axis of said shaft; and means for clamping said shaft and holding the same stationary with respect to said bracket in any desired angular relation thereto, said means comprising a drum integral with said handwheel and friction brake means mounted on said bracket and radially movable into and out of holding engagement with said drum.

6. A lathe comprising a headstock bracket member having a recess formed in one side thereof; a horizontal head shaft rotatably mounted on said bracket; work-holding means on said shaft at the other side of said bracket; a handwheel member rigidly mounted on said shaft at said one side of said bracket and closely adjacent the surface thereof, said handwheel including an integral drum nested for free rotation in said bracket recess; a friction brake screw threadedly mounted in said bracket for radial movement into and out of holding engagement with said drum for clamping said drum, handwheel and shaft and holding the same stationary with respect to said bracket in any desired angular relation thereto; and continuous indicating means including cooperating parts, one on each said member for measuring their relative angular position about the axis of said shaft.

7. A lathe comprising a headstock bracket member having a recess formed in one side thereof; a horizontal head shaft rotatably mounted on said bracket; work-holding means on one end of said shaft at the other side of said bracket; a handwheel member rigidly mounted on said shaft at said one side of said bracket and closely adjacent the surface thereof, said handwheel including an integral drum nested for free rotation in said bracket recess; a friction brake screw threadedly mounted in said bracket for radial movement into and out of holding engagement with said drum for clamping said drum, handwheel and shaft and holding the same stationary with respect to said bracket in any desired angular relation thereto; a full circle protractor scale on the side of one of said members adjacent the other; and a pointer on said other member and positioned in proximity to the graduations on said scale.

8. A lathe comprising a headstock bracket member having a recess formed in one side thereof; a horizontal head shaft rotatably mounted on said bracket; driving means rigidly mounted on said shaft; work-holding means on one end of said shaft at the other side of said bracket; a handwheel member rigidly mounted on said shaft at said one side of said bracket and closely adjacent the surface thereof, said handwheel including an integral drum nested for free rotation in said bracket recess; a friction brake screw threadedly mounted in said bracket for radial movement into and out of holding engagement with said drum for clamping said drum, handwheel and shaft and holding the same stationary with respect to said bracket in any desired angular relation thereto; a full circle protractor scale on the side of one of said members adjacent the other, said other member having a portion overlying, protecting and obscuring said scale and a notch formed in said portion revealing a small section only of scale length; and a pointer on said other member and positioned in said notch for indicative cooperation with the graduations of said scale.

9. A lathe comprising a headstock bracket; a horizontal head shaft rotatably mounted on said bracket; driving means rigidly mounted on said shaft; work-holding means on one end of said shaft at one side of said bracket; a handwheel rigidly mounted on said shaft at the other side of said bracket and closely adjacent the surface thereof; a full circle protractor scale on the side of said bracket adjacent said handwheel; and a pointer on said handwheel running in proximity to the graduations on said scale.

10. A lathe comprising a headstock bracket; a horizontal head shaft rotatably mounted on said bracket; driving means rigidly mounted on said shaft; work-holding means on one end of said shaft at one side of said bracket; a handwheel rigidly mounted on said shaft at the other side of said bracket and closely adjacent the surface thereof; a full circle protractor scale on the side of said bracket adjacent said handwheel, said handwheel having a portion overlying, protecting and obscuring said scale, and a notch formed in said portion revealing a small section only of scale length; and a pointer on said handwheel and positioned in said notch for indicative cooperation with the graduations of said scale.

11. A lathe comprising a headstock bracket member; a horizontal head shaft rotatably mounted on said bracket; driving means rigidly mounted on said shaft; work-holding means on one end of said shaft at one side of said bracket; a handwheel member rigidly mounted on said shaft at the other side of said bracket and closely adjacent the surface thereof; a full circle protractor scale on the side of one of said members adjacent the other, said other member having a portion overlying, protecting, and obscuring said scale and a notch formed in said portion revealing a small section only of scale length; and a pointer on said other member and positioned in said notch for indicative cooperation with the graduations of said scale.

12. A lathe comprising a headstock bracket member having a recess formed in one side thereof; a horizontal head shaft rotatably mounted on said bracket; driving means rigidly mounted on said shaft; work-holding means on one end of said shaft at the other side of said bracket; a handwheel member rigidly mounted on said shaft at said one side of said bracket and closely adjacent the surface thereof, said handwheel including an integral drum nested for free rotation in said bracket recess; a friction brake screw threadedly mounted in said bracket for radial movement into and out of holding engagement with said drum for clamping said drum, handwheel and shaft and holding the same stationary with respect to said bracket in any desired angular relation thereto; a full circle protractor scale on one of said members adjacent the other; and a pointer on said other member and positioned in proximity to the graduations on said scale.

13. A lathe comprising a headstock bracket; a horizontal head shaft rotatably mounted in said bracket; driving means rigidly mounted on said shaft; work-holding means on one end of said shaft at one side of said bracket; a handwheel rigidly mounted on said shaft at the other side of said bracket and closely adjacent the surface thereof; a full circle protractor scale on the periphery of said handwheel; and a pointer on said bracket extending into close proximity to said scale.

References Cited in the file of this patent

UNITED STATES PATENTS

| Number | Name | Date |
|---|---|---|
| 98,600 | Keagey | Jan. 4, 1870 |
| 416,954 | Schirk | Dec. 10, 1889 |
| 516,586 | Branstetter | Mar. 13, 1894 |
| 1,263,142 | Stubbs | Apr. 16, 1918 |
| 1,354,607 | Faust | Oct. 5, 1920 |
| 2,069,299 | Bartholomew | Feb. 2, 1937 |
| 2,227,410 | Johnson | Dec. 31, 1940 |
| 2,419,622 | Anderson | Apr. 29, 1947 |
| 2,504,249 | Bruce | Apr. 18, 1950 |
| 2,578,476 | Hollinger | Dec. 11, 1951 |

FOREIGN PATENTS

| Number | Country | Date |
|---|---|---|
| 7,671 | Great Britain | Jan. 30, 1913 |
| 524,950 | Great Britain | Aug. 19, 1940 |